(12) United States Patent
Giladi et al.

(10) Patent No.: US 11,943,487 B2
(45) Date of Patent: Mar. 26, 2024

(54) DELIVERY AND PLAYBACK OF CONTENT

(71) Applicant: Comcast Cable Communications, LLC, Philadelphia, PA (US)

(72) Inventors: Alexander Giladi, Princeton, NJ (US); Weidong Mao, West Windsor, NJ (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 1039 days.

(21) Appl. No.: 16/264,135

(22) Filed: Jan. 31, 2019

(65) Prior Publication Data

US 2020/0252663 A1    Aug. 6, 2020

(51) Int. Cl.
*H04N 21/234*  (2011.01)
*H04N 21/6379*  (2011.01)
*H04N 21/81*  (2011.01)

(52) U.S. Cl.
CPC ... *H04N 21/23424* (2013.01); *H04N 21/6379* (2013.01); *H04N 21/8126* (2013.01)

(58) Field of Classification Search
CPC ......... H04N 21/23424; H04N 21/6379; H04N 21/8126
See application file for complete search history.

(56) References Cited

U.S. PATENT DOCUMENTS

| | | | |
|---|---|---|---|
| 6,310,915 B1 | 10/2001 | Wells et al. | |
| 2012/0173751 A1* | 7/2012 | Braness | H04N 21/8456 709/231 |
| 2015/0350277 A1* | 12/2015 | Voris | H04L 47/10 709/219 |

* cited by examiner

*Primary Examiner* — Nicholas T Corbo
(74) *Attorney, Agent, or Firm* — BakerHostetler

(57) ABSTRACT

An encoder may determine one or more encoding characteristics associated with a content segment of a content asset. The one or more encoding characteristics may comprise an estimated bitrate required for transmission of the content segment over a network. The one or more encoding characteristics associated with the content segment may be inserted into a portion of an other content segment, such as into a header of the other content segment. The content segment and the other content segment may be configured for linear transmission, such as using adaptive bitrate streaming. When the other content segment is received at a playback device prior to the content segment, the playback device may use the one or more encoding characteristics of the content segment embedded in the header of the other content segment to determine one or more playback characteristics of the content segment.

24 Claims, 6 Drawing Sheets

DELIVERY AND PLAYBACK OF CONTENT

BACKGROUND

Encoding for video has traditionally followed a constant bitrate approach where bitrate is held substantially constant during a playback window of a content asset. Constant perceptual visual quality such as that perceived using a constant bitrate approach may improve the quality of a user experience. One drawback associated with the constant bitrate approach is that it allocates a similar number of bits for simple scenes where a larger bitrate may not be needed and to more complex scenes where a smaller bitrate may reduce playback quality. Variable bitrate encoding, where bitrate is allowed to vary over time, may be used to maintain better quality constancy. Benefits of using variable bitrate encoding may include conservation of bit allocation and preservation of quality constancy. However, current solutions for variable bitrate encoding are not optimized for live media transmission.

SUMMARY

Methods and systems are disclosed for providing advance information about an upcoming media segment in a linear media transmission. An encoder may determine one or more encoding characteristics associated with a content segment of a content asset. The one or more encoding characteristics may comprise an estimated bitrate required for transmission of the content segment over a network. The one or more encoding characteristics associated with the content segment may be inserted into a portion of an other content segment, such as into a header of the other content segment. The content segment and the other content segment may be configured for linear transmission, such as using adaptive bitrate streaming. When the other content segment is received at a playback device prior to the content segment, the playback device may use the one or more encoding characteristics of the content segment embedded in the header of the other content segment to determine one or more playback characteristics of the content segment and to select an appropriate version of the content segment for playback.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
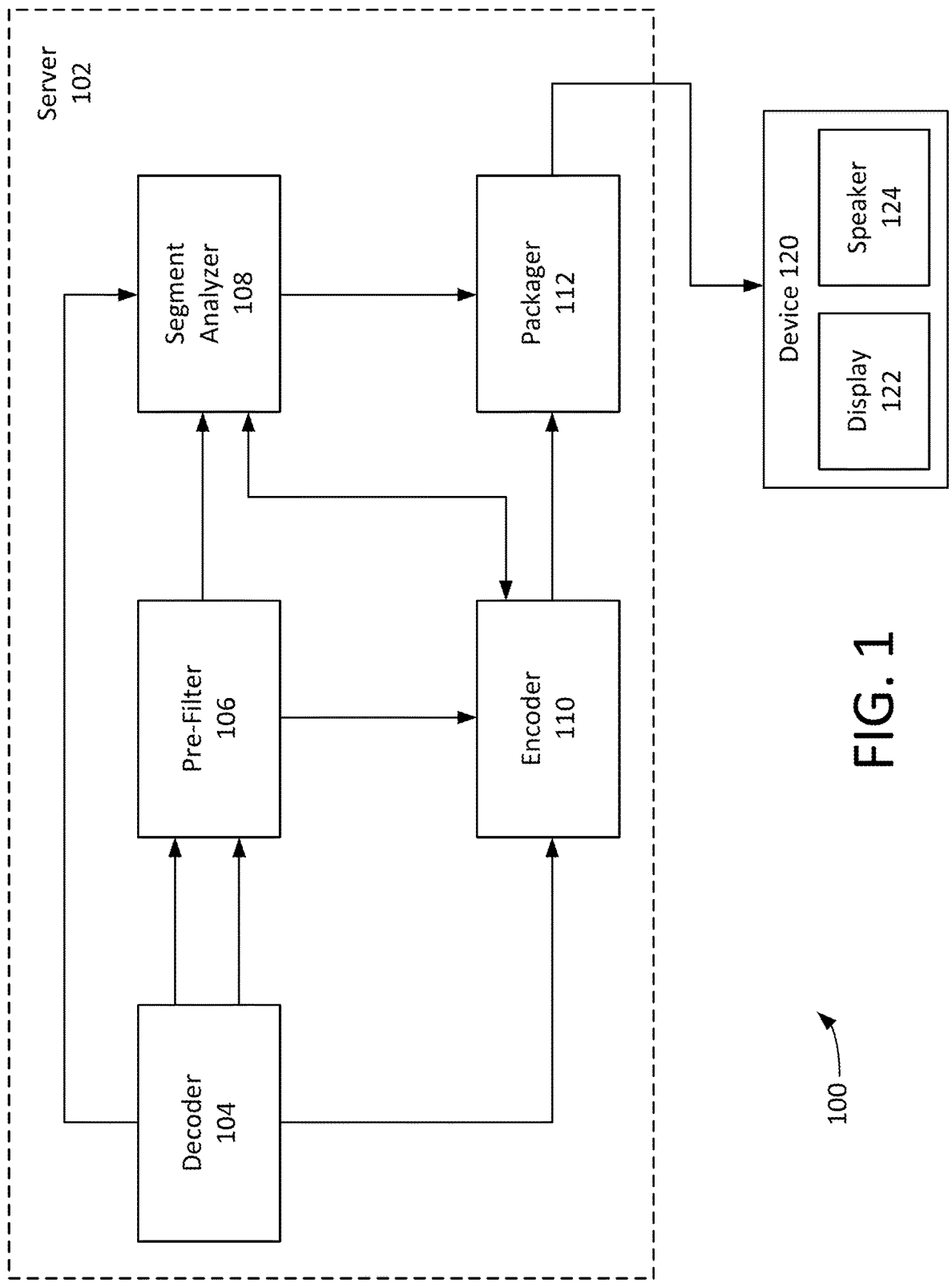
FIG. 1 is a block diagram of an example system.

Encoding for video distribution has traditionally followed a constant bitrate (CBR) approach. The CBR approach holds bitrate substantially constant within a sliding window of the encoded asset. For example, an 8 Mbps encoding with a sliding window of one second implies that each one second sequence within the content asset has the size of 1 Mbyte. This model can be formalized in terms of a hypothetic reference decoder (HRD) defined in ISO/IEC 14496-10 and ISO/IEC 23008-2. A coded picture buffer (CPB) size may be a limitation on the aggregate picture sizes at any given time. The example above can be expressed as a CPB of 1.0 seconds.

Constant perceptual visual quality has been shown to improve the quality of a user experience. However, one weakness of the CBR approach is that it allocates similar bit budgets to both relatively simple scenes, such as a talking head, and more complex scenes, such as a battle scene with various moving parts, which may include significant variation in video quality. Variable bitrate encoding (VBR) is alternative approach where bitrate is allowed to vary over time. Benefits of VBR encoding include improved quality constancy and bitrate savings by only allocating bits when they are needed.

Traditionally, the focus of VBR has been concentrated on statistical multiplexing. This approach is useful in a "fixed pipe" such as a quadrature amplitude modulation (QAM) infrastructure where 38.810 Mbit/sec channels carry multiplexes of several linear channels. While individual bitrates of these channels may vary, the aggregate bitrate of the multiplex is constant. A statistical multiplexer is a device which accepts information regarding expected content properties for all channels within the multiplex, and explicitly assigns a bit budget to each channel in the multiplex for a time window. The statistical multiplexing approach leads to a constrained VBR where the limit on bitrate of a single channel is determined by the overall capacity of the "fixed pipe" and the relative complexities of the multiplexed linear channels within a given time window.

Adaptive streaming over HTTP can be viewed as a VBR approach where video is multiplexed with all other types of IP traffic. In this case, the streaming client takes the role of the statistical multiplexer and requests the video bitrate it can sustain given the bandwidth available to it. This may allow loosely constrained VBR and results in significant bandwidth and storage cost savings. Adaptive streaming is a widely accepted approach to video distribution over best effort IP networks. Adaptive streaming solves two major problems: dynamic adaptation to changing network conditions and heterogeneity of device capabilities. In cases of high-quality encoding of long sequences, bitrate may vary significantly and "bitrate peaks" may be higher than the average.

When media (e.g., video) content is prepared for distribution using systems such as DASH, it may be encoded in multiple representations. Representations can differ by properties such as bitrate, frame rate, resolution, number of channels, sampling rate, etc. For each representation, its media file may be partitioned into media segments, which are playable small chunks of media that are typically about two to ten seconds in length. A client device may parse the media presentation description (MPD) and select a representation that it has the ability to download and present. It may then start requesting and downloading media segments and may continuously re-evaluate which representation offers the best quality and is sustainable under current network conditions. Significant bitrate peaks are expected with constant quality variable bitrate encoding. These may interfere with client rate adaptation (e.g., using DASH, HLS, etc.) as it may be unaware of the size of an upcoming segment.

Methods and systems are disclosed herein for improving delivery and playback of video content. One example of improving delivery and playback of video content for the VBR approach is to provide advance information about an upcoming media segment in a or linear media transmission. While the examples discussed throughout this disclosure refer to the use or linear media transmission, it is understood that the examples may apply to any type of media transmission, including but not limited to video on demand and IP video transmission.

An example system 100 is shown in FIG. 1. The system 100 may comprise a server 102 and a device 120. The server 102 may comprise a decoder 104, a pre-filter 106, a segment analyzer 108, an encoder 110, and a packager 112. One or more of the components 104, 106, 108, 110 or 112 may be configured to insert one or more encoding characteristics of a content segment into a portion (e.g., a header) of one or more other content segments of a content asset. While each of the components 104, 106, 108, 110 and 112 are shown in FIG. 1 as being part of the server 102, it is understood that one or more of the components may be located externally to the server 102.

An input to the server 102 (e.g., at the decoder 104) may comprise compressed or uncompressed media (e.g., video). In an example that the input comprises compressed video, the video may be compressed with codecs such as JPEG2000 or Apple® ProRes, or codecs such as MPEG-2 (H.262, ITU-T 13818-2), MPEG-4 AVC (ITU-T H.264, ISO/IEC 14496-10), and HEVC (ITU-T H.265, ISO/IEC 23008-2), or any other similar type of media content. The decoder 104 may be configured as a decoder for one or more such standards. In an example that the input comprises uncompressed video input, the decoder 104 may be configured to accept video over a serial digital interface (SDI) or an Ethernet hardware interface.

The pre-filter 106 may be configured to receive uncompressed video from the decoder 104. The pre-filter 106 may be an optional component of the server 102. The pre-filter 106 may be configured to receive input video characteristics (e.g., statistics) and compressed domain characteristics (e.g., frame types, frame and block-level quantizers, motion vectors, and coefficients). The decoder 104 and the pre-filter 106 may be configured to pass both the input video and the content characteristics to the segment analyzer 108.

The segment analyzer 108 may be configured to determine one or more encoding characteristics of a content segment in advance of the content segment's transmission time or playback time. The one or more encoding characteristics of the content segment may comprise an estimated bitrate required for transmission of the content segment or the existence of a significant change in content properties (e.g., an upcoming change in content complexity as seen in the pixel-domain and compressed-domain properties the input content). The segment analyzer 108 may be configured to pass the estimated characteristics of the content segment to one or more of the encoder 110 and the packager 112.

The encoder 110 may perform a lookahead operation to determine the one or more encoding characteristics of the content segment. Using the lookahead operation, the encoder 110 may determine one or more of a size of the content segment, a quality of the content segment, and a resolution of the content segment, and may use the information associated with the content segment to determine the one or more encoding characteristics of the content segment. The encoder 110 may be configured to encode multiple versions of the content segment, such as a version of the content segment at a plurality of resolutions (e.g., 480p, 720p, 1080p, etc.) which may be packaged by the packager 112.

The encoder 110 may be a multi-pass encoder. A first stage (lookahead) encoder may be configured to examine the content segment and to determine one or more encoding characteristics for the content segment. The first stage encoder may comprise a real-time encoder, and may provide a second stage encoder with frame encoding parameters such as a type, a quantizer, and a maximum number of bits. The second stage encoder may receive the information from the first encoder and produce a compressed frame or segment. The encoder 110 may be configured to pass compressed frame to the packager 112, which may generate media segments and manifests such as MPD (DASH) or m3u8 (HLS).

The packager 112 may be configured to insert the one or more encoding characteristics of the content segment into a portion of one or more other content segments using mechanisms such as, for example, the DASH inband message or an ID3v2 tag. The packager 112 may insert the one or more encoding characteristics of the content segment into a header of one or more other content segments. The one or more other content segments may be configured for transmission to the device 120 prior to the content segment. The packager 112 may embed the estimated characteristics in the media content and transmit it to the device 120. While FIG. 1 shows an example where the packager 112 inserts that one or more encoding characteristics into the portion of the content segment, it is understood that this functionality may be performed by any other of the components shown in FIG. 1 or a combination of those components.

The device 120 may be configured to receive, in a header of another content segment, one or more encoding characteristics of a content segment, and to determine one or more playback characteristics of the content segment. The device 120 may comprise a display 122 and a speaker 124.

The display 122 may be configured to display one or more content segments of the content asset. The display 22 may include any device capable of displaying video or image content to a user, such as a tablet, a computer monitor, or a television screen. The display 122 may be part of the device 120 such as in the example that the device 120 is a tablet or a computer. The display 122 may be separate from the device 120 such as in an example that the device 120 is a set top box and the display 122 is a television screen in electrical communication with the set top box.

The speaker 124 may be configured to output audio associated with the content segments. The speaker 124 may be any device capable of outputting audio associated with the media file. The speaker 124 may be part of the device 120 such as in the example that the device 120 is streaming player or a tablet or a computer. The speaker 124 may be separate from the device 120 such as in an example that the device 120 is a set top box and the speaker 124 is a television or other external speaker in electrical communication with the set top box.

Figure 2:
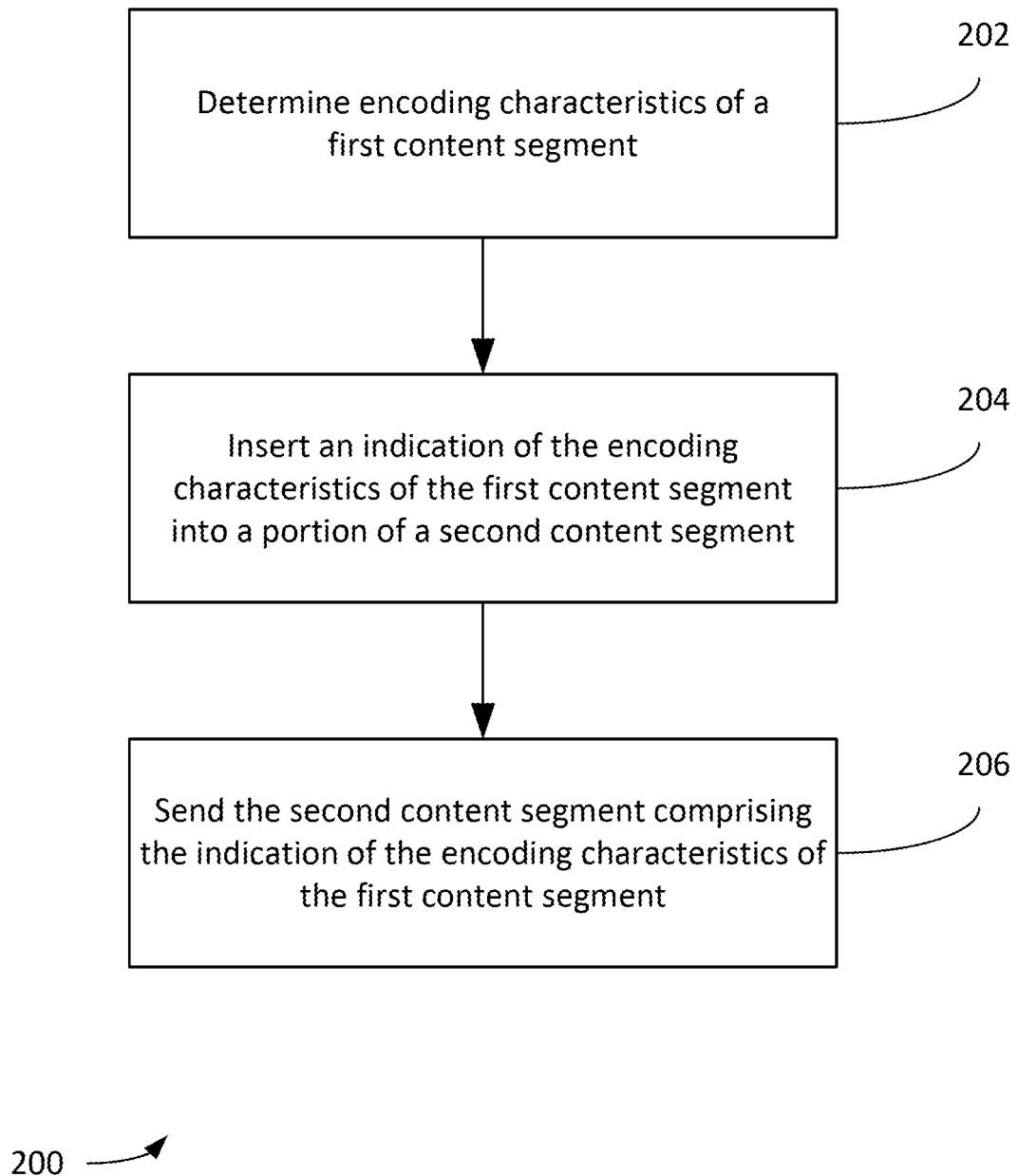
FIG. 2 is a flowchart of an example method.

FIG. 2 shows a flow chart of an example method 200. At step 202, one or more encoding characteristics of a first content segment may be determined. The first content segment may be associated with a content asset. The content asset may be any type of media asset capable of being played by a device, such as a television show, a movie, streaming media content, etc., or a portion thereof. The content asset may comprise a plurality of content segments. Each of the content segments may correspond to a portion of the content asset, such as a two second portion of the content asset or a ten second portion of the content asset.

The one or more encoding characteristics of the first content segment may comprise an estimated bitrate required for transmission of the first content segment over a network. The one or more encoding characteristics may additionally or alternatively comprise a segment duration, a non-reference visual quality metric of the segment, a full-reference visual quality metric of the segment, etc. The visual quality metrics of the content segment may indicate a quality of the segment in cases of different pixel densities of the display device (e.g., pixel density of a 1080p phone vs 1080p 40-inch TV).

The one or more encoding characteristics of the first content segment may be determined based on information associated with the first content segment, such as a size of a prior segment within the content asset, properties of the content segment representation such as a resolution, a bit depth, a dynamic range, and a frame rate of the content segment, and/or one or more other content characteristics including but not limited to a non-reference indication of visual quality of the contribution (source) version of the first content segment (including an indication of artefacts like blockiness). Such content features may be statistical properties of the media picture (variance, histograms, etc.), properties of a plurality of consequent frames (scene boundaries and their types, motion field characteristics such as quality and uniformity, etc.), as well as the properties of the contribution (source) video format (e.g., percentage of skip modes, quantizer values, etc., of the incoming video), an indication of future change of content transmitted as SCTE 35 message, etc.

The determination of the estimated encoding characteristics may be performed using machine learning approaches including but not limited to convolutional neural networks (CNN) and recurring neural networks (RNN). In cases of machine learning techniques accepting feedback, the differences between the actual encoding characteristics of the first content segment and its estimate may be used on such feedback. It is understood that the encoding characteristics are not limited to these examples and may include any type of encoding characteristic of the first content segment. It is further understood that the characteristics may additionally or alternatively include other characteristics of the first content segment not including encoding characteristics.

Determining the one or more encoding characteristics of the first content segment may comprise performing a lookahead operation in the content asset. Using the lookahead operation, the server may be configured to determine the information associated with first content segment in advance of the first content segment's transmission time or playback time. The server may use the information from the lookahead operation to determine an estimated bitrate required for transmission of the first content segment over the network. For example, the server may determine that a bitrate of 4 Mbps may be required for a 1080p (e.g., 1920×1080, 2.07 megapixels) version of the first content segment and that a bitrate of 2 Mbps may be required for 720p (1280×720, 0.92 megapixels) version of the first content segment.

The lookahead operation may comprise a trial encode of the first content segment in order to determine information such as a bit allocation and a slice type for the first content segment. This information may then be used as a starting point for encoding the first content segment. A segment encoding function may accept this information and may return a final encoded first content segment where the media content within the first content segment is encoded based on this information. The server may be able to determine the one or more playback characteristics of the content segment without referring to a manifest file associated with the content asset.

At step 204, an indication of the one or more encoding characteristics of the first content segment may be inserted into a portion of a second content segment. The second content segment may be associated with the same content asset as the first content segment. The portion of the second content segment may be a header of the second content segment. Inserting the one or more encoding characteristics of the first content segment into the portion of the second content segment may comprise inserting the one or more characteristics of the first content segment into the header of the second content segment. The first content segment and the second content segment may be configured for linear transmission. For example, the first content segment and the second content segment may be configured for adaptive bitrate (ABR) streaming.

The one or more encoding characteristics of the first content segment may be inserted into the portion of the second content segment by embedding a table comprising the encoding characteristics of one or more representations of the first content segment into the second segment. This can be done for example using an 'emsg' box contained in segment formats such as ISO-BMFF (ISO Base Media File Format and MPEG-2 TS of the second content segment and prepending the 'emsg' box to the start of the second content segment. In an example that uses MPEG DASH, the encoding characteristics of the first content segment may be carried in one or more XML element(s) of the AdaptationSet or Representation elements within the MPD, as discussed above. In an example that uses HLS, the table may be embedded in a tag within a second-level (rendition) m3u8 file or in an ID3v2 private frame Encoder Boundary Point (EBP) may be used in an example where the table would be transmitted at the end of the message.

At step 206, the second content segment may be sent to a device. The second content segment may comprise an indication of the one or more encoding characteristics of the first content segment. The one or more encoding characteristics of the first content segment may be contained in the header of the second content segment. The second content segment may be sent to the device prior to the first content segment. The second content segment may be configured for playback by the device prior to the first content segment. The first content segment may be sent to the device after the second content segment. The first content segment may comprise information associated with one or more other content segments, such as one or more encoding characteristics of one or more other content segments that follow the first content segment.

The device may be configured to determine one or more playback characteristics of the first content segment based on the received indication of the one or more encoding characteristics of the first content segment contained in the portion of the second content segment. For example, the second content segment (which is played prior to the first content segment) may require a bitrate of 2 Mbps for a 720p resolution of the content segment. The device may determine that a 1080p version of the first content segment requires a bitrate of 4 Mbps and that the 720p version of the first content segment requires a bitrate of 2 Mbps. The device may determine to request playback of one of the 1080p version of the first content segment or the 720p version of the first content segment based on a current network bandwidth available to the device.

Multi-pass encoders may be used for providing advance information about an upcoming media segment in live media transmission. A first stage ("lookahead") encoder may be configured to examine the content segment and to determine one or more encoding characteristics for the content segment, such as an estimated bitrate required for transmission of the content segment. The first stage encoder may comprise a real-time multi-rate adaptive streaming encoder, and may be used for estimation purposes. The first stage encoder may have a lookahead delay of D1 seconds while an estimator may have a delay of D2 seconds (which may be same or longer than a segment duration) to estimate the bitrates and quality parameters (QP) for the second stage encode. As a result of the estimation, a good approximation of size and quality of the upcoming segment may be available before the second encode. The first stage encoder may store information associated with the one or more encoding characteristics for the content segment. The second stage encoder may receive the information from the first encoder and may determine a bitrate for the content segment based on the information received from the first encoder. The second stage encoder may be used for outputting the final bitstreams which, may be packaged by a packager into media segments and further delivered to consumers using protocols such as MPEG DASH and Apple® HLS.

The information output by the second encoder may be organized into a table. The information may be indexed by representation order in an adaptation set, a hash of representation ID, or by any other unique per-representation sequence of bytes. When the results of final encodes for each resolution are packaged into segments at the end of the second stage encode, the table may be updated to include information for one or more future segments. Thus, the size and quality estimates for the upcoming segments can be communicated to the adaptive streaming clients. On reception of the information, the client may check whether it can sustain the bitrate given the information known about the upcoming segments. It may also estimate the quality of the next two segments and switch to a lower representation in case the quality of this representation is sufficient.

The client may be located at the CPE (such as a set-top box, a TV, or a mobile device), at the server-side edge location such as the location of CMTS, or the point at which the traffic is modulated (e.g., QAM). In the case of server-side client, this client may be acting as a statistical multiplexer and may take into account the overall bandwidth available to video services. The overall customer satisfaction may be improved if a predictive model of the top channels (e.g., 20-50 channels) can be built, and higher visual quality rates can be assigned to more popular channels. The approach can be applied both to IP and QAM services, as well as to wireless and UDP-based distribution services, and reliable streaming using protocols such as SRT, WebRTC, ROUTE/DASH, etc.

Figure 3:
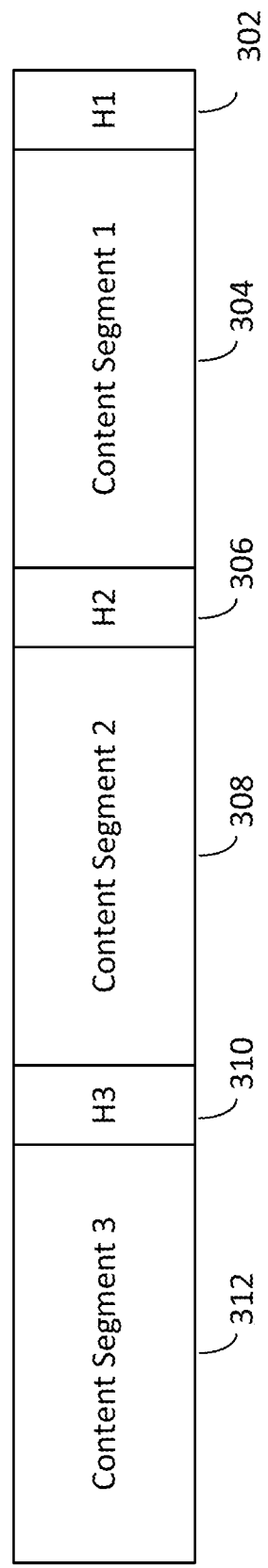
FIG. 3 shows an example content asset.

FIG. 3 shows an example of a content asset 300 comprising content segments 304, 308 and 312. While the content asset 300 is shown as having three content segments, it is understood that the content asset may have any number of segments. Each of the content segments may have a defined duration, such as two seconds or ten seconds of content. An example thirty-minute content asset may comprise 900 content segments each being two seconds in duration. Each of the content segments may comprise a header. FIG. 3 shows a header 302 associated with content segment 304, a header 306 associated with content segment 308, and a header 310 associated with content segment 312. The header associated with a particular content segment may comprise information associated with the content segment, such as a size of the content segment, a quality of the content segment, and a resolution of the content segment. The header may additionally or alternatively comprise information associated with one or more other content segments of the content asset, such as one or more encoding characteristics associated with one or more of the other content segments of the content asset.

As disclosed herein, a header of a particular content segment may comprise one or more encoding characteristics of one or more other content segments. Header 302 associated with content segment 304 may comprise one or more encoding characteristics associated with content segment 308 and/or content segment 312. Content segments 308 and 312 may be configured for transmission to the playback device after content segment 304. As shown in FIG. 3, a playback device may be configured to receive and cause playback of content segment 304, content segment 308, and content segment 312 in that order. The header 302 associated with content segment 304 may comprise an estimated bitrate required for transmission of content segment 308 and/or content segment 312 over a network. Similarly, header 306 associated with content segment 308 may comprise an estimated bitrate required for transmission of content segment 312 over the network.

Upon receipt of the content segment 304 and the content header 302, a playback device may be configured to analyze information contained in the header 302 to determine one or more playback characteristics of content segment 308 based on information contained in the header 302. The playback device may determine based on the information in the header 302 that there are multiple versions of the content segment 308 available for playback. A first version of the content segment 308 may have a resolution of 1080p and require a bitrate of 4 Mbps for transmission while a second version of the content segment 308 may have a resolution of 720p and require a bitrate of 2 Mbps for transmission. The playback device may analyze a network connection or bandwidth available to the device in order to determine which version of the content segment to request. Based on determining that the playback device has a download capacity of 6 Mbps, the playback device may decide to request the 1080p version of the content segment 308 from the content server. Based on determining that the playback device has a download capacity of 3 Mbps, the playback device may decide to request the 720p version of the content segment 308 from the content server.

Figure 4:
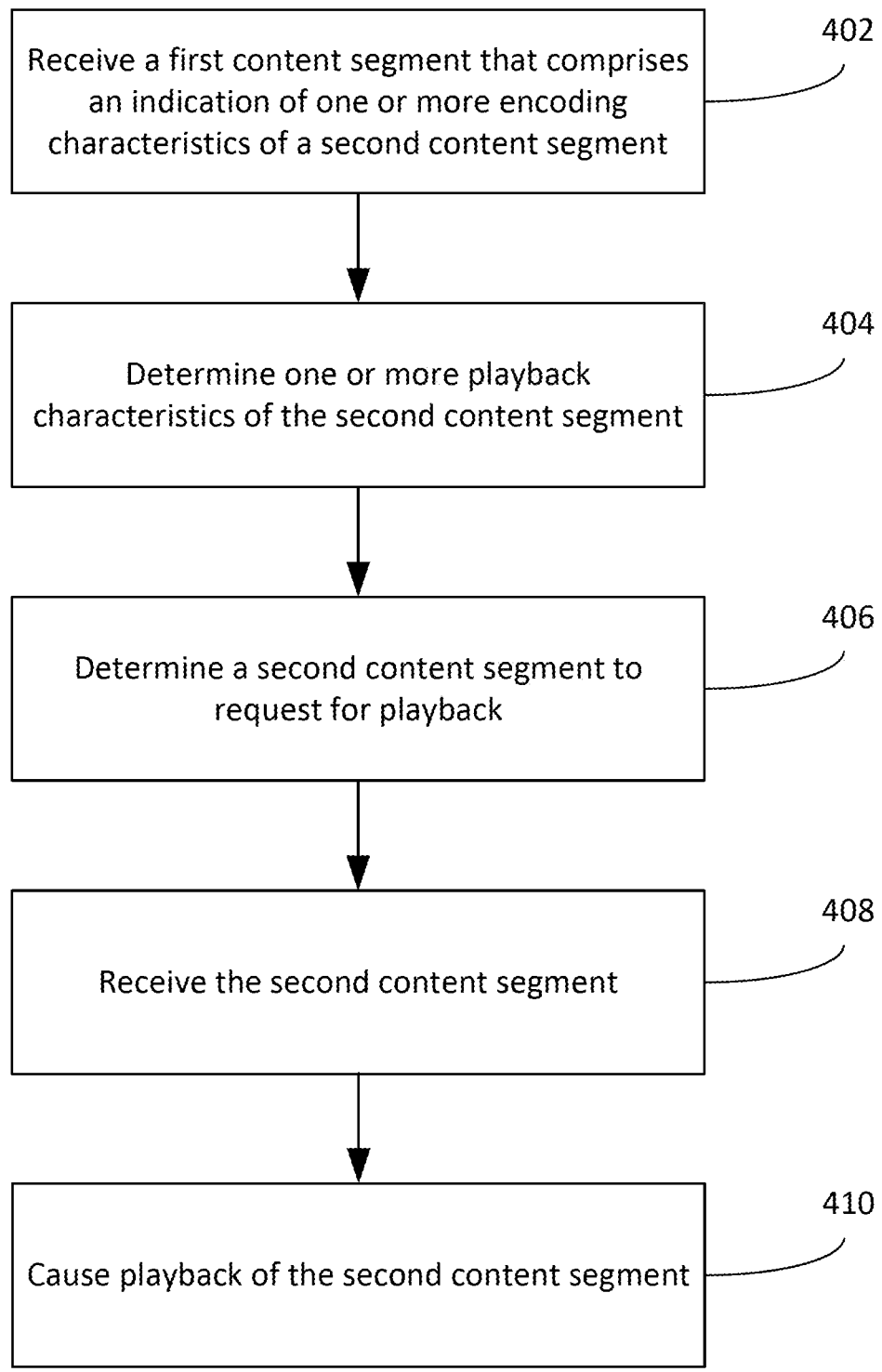
FIG. 4 is a flowchart of an example method.

FIG. 4 shows an example method 400. At step 402, a first content segment may be received. The first content segment may be associated with a content asset. The content asset may be any type of media asset capable of being played by a device, such as a television show, a movie, streaming media content, etc., or a portion thereof. The content asset may comprise a plurality of content segments. Each of the content segments may correspond to a portion of the content asset, such as a two second portion of the content asset or a ten second portion of the content asset. The first content segment may be received by a device such as a playback device.

A portion of the first content segment may comprise an indication of one or more encoding characteristics of a second content segment of the content asset. The portion of the first content segment may be a header of the first content segment. The one or more encoding characteristics of the second content segment may comprise an estimated bitrate required for transmission of the second content segment over a network. The one or more encoding characteristics of the second content segment may be based on one or more of a size of the second content segment, a quality of the second content segment, and a resolution of the second content segment. The first content segment and the second content segment may be configured for linear transmission. For example, the first content segment and the second content segment may be configured for adaptive bitrate (ABR) streaming.

While the examples discussed throughout this disclosure refer to the use or linear media transmission, it is understood that the examples may apply to any type of media transmission, including but not limited to video on demand and IP video transmission.

The one or more encoding characteristics of the second content segment may be determined based on lookahead operation in the content asset performed by the server. Using the lookahead operation, the server may be configured to determine the information associated with the second content segment in advance of the second content segment's transmission time or playback time. The server may use the information from the lookahead operation to determine an estimated bitrate required for transmission of the second content segment over the network. For example, the server may determine that a bitrate of 4 Mbps may be required for a 1080p (e.g., 1920×1080, 2.07 megapixels) version of the second content segment and that a bitrate of 2 Mbps may be required for 720p (1280×720, 0.92 megapixels) version of the second content segment.

At step 404, one or more playback characteristics of the second content segment may be determined. The device may be configured to determine one or more playback characteristics of the second content segment based on the received indication of the one or more encoding characteristics of the second content segment contained in the portion of the first content segment. For example, the first content segment (which is played prior to the first content segment) may require a bitrate of 2 Mbps for a 720p resolution of the content segment. The device may determine that a 1080p version of the second content segment requires a bitrate of 4 Mbps and that the 720p version of the second content segment requires a bitrate of 2 Mbps.

At step 406, the device may determine an appropriate version of the second content segment for playback. For example, the device may determine to request playback of one of the 1080p version of the second content segment or the 720p version of the second content segment based on a current network bandwidth available to the device. The device may additionally or alternatively send to the server a request for the determined or selected version of the second content segment.

At step 408, the second content segment may be received. The second content segment may be received at the device after the first content segment. The second content segment may be configured for playback by the device after playback of the first content segment. The first content segment may be received at the device before the second content segment. The second content segment may comprise another segment of the content asset. For example, the first content segment may correspond to a first two-second fragment of the content asset and the second content segment may correspond to a second two-second fragment of the content asset. A header of the second content segment may comprise information associated with one or more encoding characteristics of one or more other segments of the content asset.

At step 410, playback of the second content segment may be caused. Playback of the second content segment may be based on the one or more playback characteristics of the second content segment. Based on determining that the playback device has a download capacity of 6 Mbps, the playback device may decide to request the 1080p version of the second content segment from the content server. Based on determining that the playback device has a download capacity of 3 Mbps, the playback device may decide to request the 720p version of the second content segment from the content server.

Figure 5:
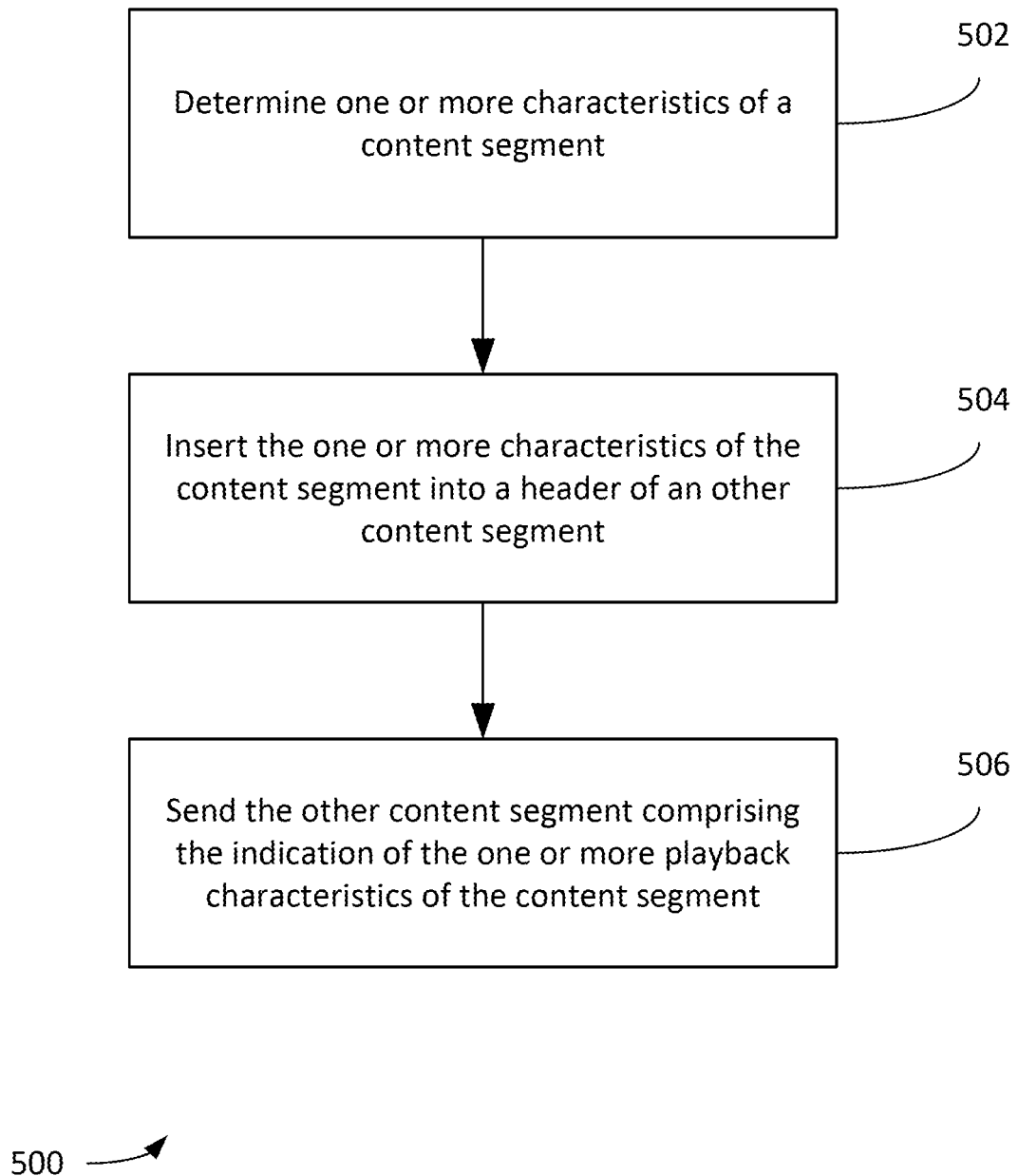
FIG. 5 is a flowchart of an example method.

FIG. 5 shows a flow chart of an example method 500. At step 502, one or more encoding characteristics of a content segment may be determined. The content segment may be associated with a content asset. The content asset may be any type of media asset capable of being played by a device, such as a television show, a movie, streaming media content, etc., or a portion thereof. The content asset may comprise a plurality of content segments. Each of the content segments may correspond to a portion of the content asset, such as a two second portion of the content asset or a ten second portion of the content asset.

The one or more encoding characteristics of the content segment may comprise an estimated bitrate required for transmission of the content segment over a network. The one or more encoding characteristics of the content segment may be determined based on information associated with the content segment, such as a size of the content segment, a quality of the content segment, and a resolution of the content segment. It is understood that the encoding characteristics are not limited to these examples and may include any type of encoding characteristic of the content segment. It is further understood that the characteristics may additionally or alternatively include other characteristics of the content segment not including encoding characteristics.

Determining the one or more encoding characteristics of the content segment may comprise performing a lookahead operation in the content asset. Using the lookahead operation, the server may be configured to determine the information associated with content segment in advance of the content segment's transmission time or playback time. The server may use the information from the lookahead operation to determine an estimated bitrate required for transmission of the content segment over the network. For example, the server may determine that a bitrate of 4 Mbps may be required for a 1080p version of the content segment and that a bitrate of 2 Mbps may be required for 720p version of the content segment.

At step 504, an indication of the one or more encoding characteristics of the content segment may be inserted into a portion of an other content segment. The other content segment may be associated with the same content asset as the content segment. The portion of the other content segment may be a header of the other content segment. Inserting the one or more encoding characteristics of the content segment into the portion of the other content segment may comprise inserting the one or more characteristics of the content segment into the header of the other content segment. The content segment and the other content segment may be configured for linear transmission. For example, the content segment and the other content segment may be configured for adaptive bitrate (ABR) streaming.

At step 506, the other content segment may be sent to a device. The other content segment may comprise an indication of the one or more encoding characteristics of the content segment. The one or more encoding characteristics of the content segment may be contained in the header of the other content segment. The other content segment may be sent to the device prior to the content segment. The other content segment may be configured for playback by the device prior to the content segment. The content segment may be sent to the device after the other content segment. The content segment may comprise information associated with one or more other content segments, such as one or more encoding characteristics of one or more other content segments that follow the content segment.

The device may be configured to determine one or more playback characteristics of the content segment based on the received indication of the one or more encoding characteristics of the content segment contained in the portion of the other content segment. For example, the other content segment (which is played prior to the content segment) may require a bitrate of 2 Mbps for a 720p resolution of the content segment. The device may determine that a 1080p version of the content segment requires a bitrate of 4 Mbps and that the 720p version of the content segment requires a bitrate of 2 Mbps. The device may determine to request playback of one of the 1080p version of the content segment or the 720p version of the content segment based on a current network bandwidth available to the device.

Figure 6:
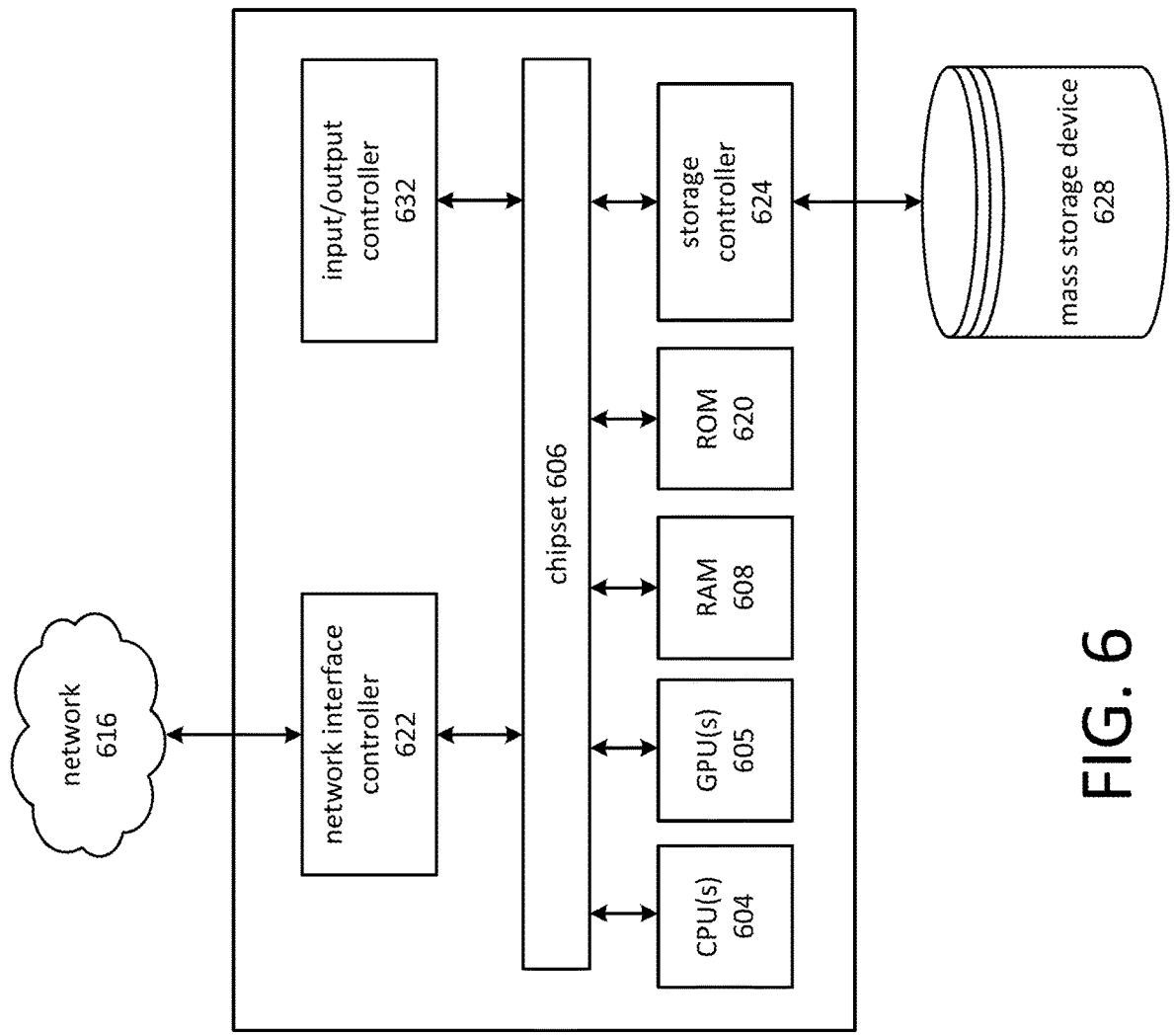
FIG. 6 is a block diagram of an example computing device.

FIG. 6 depicts a computing device that may be used in various aspects, such as the servers, modules, and/or devices depicted in FIG. 1. With regard to the example architecture of FIG. 1, the server 102, the media file processor 104, the encoder 106, the database 108, the device 120, the processor 112, the display 114, and/or the speaker 116 may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2, 4 and 5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A user interface may be provided between the CPU(s) 604 and the remainder of the components and devices on the baseboard. The interface may be used to access a random access memory (RAM) 608 used as the main memory in the computing device 600. The interface may be used to access a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein. The user interface may be provided by a one or more electrical components such as the chipset 606.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a storage device 628 that provides non-volatile storage for the computer. The storage device 628 may store system programs, application programs, other program modules, and data, which have been described in greater detail herein. The storage device 628 may be connected to the computing device 600 through a storage controller 624 connected to the chipset 606. The storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 628 is characterized as primary or secondary storage and the like.

For example, the computing device 600 may store information to the storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the storage device 628 by detecting the physical states or characteristics of one or more particular locations within the physical storage units.

In addition to the storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 628 may store other system or application programs and data utilized by the computing device 600.

The storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 2, 4 and 5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
    determining one or more characteristics of a first content segment associated with a content asset;
    inserting, into a portion of a second content segment associated with the content asset, an indication of the one or more characteristics of the first content segment;
    sending, to a device, the second content segment comprising the indication of the one or more characteristics of the first content segment, wherein the second content segment is transmitted to the device prior to the first content segment; and
    sending, to the device, a version of the first content segment, wherein the version of the first content segment is selected based at least on the indication of the one or more characteristics of the first content segment sent with the second content segment.

2. The method of claim 1, wherein the portion of the second content segment is a header of the second content segment.

3. The method of claim 1, wherein the first content segment and the second content segment are configured for linear transmission.

4. The method of claim 1, wherein determining the one or more characteristics of the first content segment comprises performing a lookahead operation.

5. The method of claim 1, wherein the one or more characteristics of the first content segment comprise an estimated bitrate required for transmission of the first content segment.

6. The method of claim 1, wherein the second content segment is configured for playback prior to the first content segment.

7. The method of claim 1, wherein the one or more characteristics of the first content segment are stored in a table that is accessible by the device.

8. The method of claim 1, wherein the version of the first content segment is associated with a required bitrate for transmission, and wherein the version of the first content segment is selected based on the required bitrate for transmission and at least one of a download capacity of the device or a current network condition associated with the device.

9. A method comprising:
receiving a first content segment associated with a content asset, wherein a portion of the first content segment comprises an indication of one or more characteristics of a second content segment of the content asset;
determining, based on the one or more characteristics of the second content segment, one or more output characteristics of the second content segment;
selecting, based on the one or more output characteristics of the second content segment, a version of the second content segment;
receiving the version of the second content segment; and
causing output of the version of the second content segment, wherein the first content segment is received prior to the version of the second content segment.

10. The method of claim 9, wherein the portion of the first content segment is a header of the first content segment.

11. The method of claim 9, wherein the first content segment and the second content segment are configured for linear transmission.

12. The method of claim 9, wherein the one or more characteristics of the second content segment are determined using a lookahead operation.

13. The method of claim 9, wherein the one or more characteristics of the second content segment comprise an estimated bitrate required for transmission of the second content segment.

14. The method of claim 13, wherein determining, based on the one or more characteristics of the second content segment, one or more output characteristics of the second content segment comprises determining, based on the estimated bitrate required for transmission of the second content segment, a required bitrate for transmission associated with each of a plurality of versions of the second content segment.

15. The method of claim 9, further comprising causing output of the first content segment prior to causing output of the second content segment.

16. The method of claim 9, wherein the one or more output characteristics of the second content segment comprises a required bitrate for transmission associated with each of a plurality of versions of the second content segment.

17. The method of claim 16, wherein each of the plurality of versions of the second content segment are associated with a different resolution.

18. The method of claim 9, wherein selecting, based on the one or more output characteristics of the second content segment, the version of the second content segment is further based on at least one of a current network connection or a current download capacity.

19. An apparatus comprising:
a processor; and
a memory storing computer executable instructions that, when executed by the processor, cause the apparatus to:
determine one or more characteristics of a first content segment associated with a content asset;
insert, into a portion of a second content segment associated with the content asset, an indication of the one or more characteristics of the first content segment;
send, to a device, the second content segment comprising the indication of the one or more characteristics of the first content segment, wherein the second content segment is transmitted to the device prior to the first content segment; and
send, to the device, a version of the first content segment, wherein the version of the first content segment is selected based on the indication of the one or more characteristics of the first content segment sent with the second content segment.

20. The apparatus of claim 19, wherein the portion of the second content segment is a header of the second content segment.

21. The apparatus of claim 19, wherein the first content segment and the second content segment are configured for linear transmission.

22. The apparatus of claim 19, wherein determining the one or more characteristics of the first content segment comprises performing a lookahead operation.

23. The apparatus of claim 19, wherein the one or more characteristics of the first content segment comprise an estimated bitrate required for transmission of the first content segment.

24. The apparatus of claim 19, wherein the second content segment is configured to be output prior to the first content segment.

* * * * *